United States Patent [19]

Akiyama et al.

[11] 4,433,235

[45] Feb. 21, 1984

[54] FOCUSING POSITION DETECTING DEVICE IN OPTICAL MAGNIFYING AND OBSERVING APPARATUS

[75] Inventors: Nobuyuki Akiyama; Yoshimasa Ohshima; Mitsuyoshi Koizumi, all of Yokohama, Japan

[73] Assignee: Hitachi, Ltd., Tokyo, Japan

[21] Appl. No.: 310,240

[22] Filed: Oct. 9, 1981

[30] Foreign Application Priority Data

Oct. 9, 1980 [JP] Japan .................... 55-140610
May 25, 1981 [JP] Japan .................... 56-78096

[51] Int. Cl.³ .................... G01J 1/20; G01J 1/32
[52] U.S. Cl. .................... 250/201; 250/205
[58] Field of Search .................... 250/201, 205; 369/45

[56] References Cited

U.S. PATENT DOCUMENTS 4,363,961 12/1982 Okada et al. .................... 250/201

*Primary Examiner*—F. L. Evans
*Attorney, Agent, or Firm*—Antonelli, Terry & Wands

[57] ABSTRACT

A focusing position detecting device in which a laser beam is directed through an objective lens toward the surface of an object to form a minute spot on the surface of the object, and the beam reflected from the surface of the object is led through the objective lens again toward a concentrating point, so as to detect the focusing position of the objective lens by measuring the position of the concentrating point. In the device, a photoelectric element is provided to detect the intensity of the reflected beam, and the intensity of the laser beam is so controlled that the output of the photoelectric element is maintained constant.

9 Claims, 10 Drawing Figures

FOCUSING POSITION DETECTING DEVICE IN OPTICAL MAGNIFYING AND OBSERVING APPARATUS

BACKGROUND OF THE INVENTION

1. Field of the Invention

This invention relates to a focusing position detecting device in an optical magnifying and observing apparatus which magnifies very small or fine patterns for observation with observing means such as a microscope.

2. Description of the Prior Art

LSI's of high integration density, bubble memories, photosensitive plates of image pickup tubes, and the like have very small or fine patterns of 2 to 3 μm, and microscopes of high magnification are used for the inspection of the external appearance of these parts. The depth of the focus of such a high-magnification microscope is not more than 1 μm, and automatic focusing with high accuracy is therefore demanded.

The basic principle of attaining focusing in an apparatus commonly used for optically magnifying and observing a fine pattern will be described with reference to FIG. 1, for a better understanding of the present invention.

Generally, an optical magnifying and observing apparatus comprises two optical systems, i.e., an observing system and a focusing position detecting system. However, in view of the fact that the present invention is specifically concerned with a focusing position detecting device, the latter or focusing position detecting system is only shown in FIG. 1, and the former or observing system is not shown to avoid confusion. Briefly describing, this observing system is to be understood to be a system in which visible radiation is projected through an objective lens 4 on the surface of an object 5 and radiation reflected therefrom is received for observation. (In such a system, a half-mirror of predetermined design is essentially required.)

In the example shown in FIG. 1, a laser beam 1 is employed for the purpose of focusing position detection. The laser beam 1 is diverged by a concave lens 2, reflected then by a half-mirror 3 and concentrated by an objective lens 4 on the surface of an object 5. In FIG. 1, the position of the object 5 is indicated by the solid line when the laser beam 1 is accurately focused by the objective lens 4, and a minute spot 6 is formed on the surface of the object 5 in that case. The beam 7 reflected from the surface of the object 5 passes through the objective lens 4 again and passes then through the half-mirror 3 to be concentrated on a point 8.

The combination of a pin-hole plate 9 formed with a pin hole 10 and a photoelectric element 11 is provided for detecting the position of the concentrating point 8. The pin-hole plate 9 is arranged to oscillate in a direction of the arrow X (that is, in a vertical direction) in FIG. 1. FIG. 2 shows the waveform of the output from the photoelectric element 11. In FIG. 2, the horizontal axis X represents the direction of oscillation of the pinhole plate 9, and the vertical axis V represents the level of the output from the photoelectric element 11.

When now the reflected beam 7 from the object 5 is concentrated on the point 8 in the pin-hole 10 of the pin-hole plate 9 as shown by the solid lines in FIG. 1, the output V from the photoelectric element 11 has a generally triangular waveform having a peak at the point 8 on the X-axis, as shown by a curve 12 in FIG. 2. The output V from the photoelectric element 11 has such a waveform since the pin-hole plate 9 is oscillating V in the direction of the X-axis around the concentrating point 8 of the reflected beam 7. It will be seen in FIG. 2 that the output V from the photoelectric element 11 becomes lower as the pin-hole plate 9 moves a greater distance away from the concentrating point 8.

Suppose that the surface of the object 5 shown by the solid line is displaced away from the objective lens 4 by a distance Z and is now located at a position 5' as shown by the broken line. In such a case, the reflected beam 7' concentrates on another point 8'. Therefore, when the pin-hole plate 9 is moved to the concentrating point 8', the output V from the photoelectric element 11 has a generally triangular waveform having its peak at the point 8' on the X-axis, as shown by another curve 12' in FIG. 2.

Thus, whether or not the surface of the object 5 lies on the focusing position of the objective lens 4 can be detected by finding whether or not the output V from the photoelectric element 11 at the point 8 is maximum, provided that the pin-hole plate 9 oscillates around the concentrating point 8 in FIG. 1 (the point 8 on the X-axis in FIG. 2). Therefore, the laser beam 1 can be focused by the objective lens 4 on the surface of the object 5 by moving either the object 5 or the objective lens 4 until the photoelectric element 11 generates its maximum output V.

FIG. 3 is a partly exploded perspective view of a prior art focusing position detecting device based on the principle above described. The structure and defects of the prior art device will now be described. In FIG. 3, the same reference numerals are used to designate the same parts appearing in FIG. 1. The observing system is disposed along the optical path indicated by the large arrow A, and its members are not especially shown to avoid confusion. A gas laser beam is used in FIG. 3, and the reference numeral 20 designates a gas laser beam emitter. The laser beam 1 emitted from the gas laser beam emitter 20 is converged by a convex lens 21 and is then diverged by a concave lens 2. After passing through a polarization beam splitter 22 and a quarter wavelength element 23, the laser beam 1 is reflected by a reflector 24 and is then concentrated by the condenser lens 4 to form a minute spot 6 on the surface of an object 5. The reflected beam 7 from the object 5 is concentrated by the objective lens 4 again, and, after passing through the reflector 24 and quarter wavelength element 23, is deflected by the polarization beam splitter 22 to be directed in a direction orthogonal with respect to the previous direction. Then, the reflected laser beam 7 passes through a concave lens 25 and is concentrated by a condenser lens 26 to form a laser spot. The pin-hole plate 9 having the pin-hole 10 is oscillated, and the beam passing throug the pin-hole 10 is detected by the photoelectric element 11.

The waveform of the output V from the photoelectric element 11 is shown on the right-hand side of the photoelectric element 11 in FIG. 3. It will be seen that the displacement x of the pin hole 10 of the oscillating pin-hole plate 9 is plotted on the horizontal axis 27 and the output V from the photoelectric element 11 is plotted on the vertical axis 28. The curve 12 represents the signal waveform of the output V from the photoelectric element 11. Therefore, the object 5 is moved in the vertical direction for the purpose of focus adjustment until the maximum output V appears from the photoelectric element 11 at the center of oscillation of the pin-hole 10.

However, a problem as pointed out presently is involved in the prior art device described above.

It is generally acknowledged that, in such an observing apparatus, it is necessary to suitably adjust the focus of the optical system for observation of an object, and it is also necessary to observe various portions of the object while, for example, moving the object in a lateral direction. The direction of movement of the object 5 while attaining automatic focusing is indicated by the arrow B in FIG. 3 and similarly by the arrow B in FIG. 1. With the movement of the object 5 in the direction of the arrow B, a pattern 5a on the object 5 moves naturally in the same direction. Since the factor of reflection varies depending on the portion of the pattern 5a, the intensity of reflected beam 7 varies also with the movement of the object 5.

Suppose now that a pattern 5a having a high reflection factor is present on the surface of the object 5, and such a pattern 5a is moving at a high speed in the direction of the arrow B in FIG. 1 and FIG. 3. The beam 7 reflected from the pattern 5a having the high reflection factor passes in front of the pin-hole 10 while the pin-hole plate 9 is under oscillation. Consequently, the output V from the photoelectric element 11 within the oscillation range X of the pin-hole plate 9 will have a wafeform as shown in FIG. 4, and, it will be seen in FIG. 4 that a peak output $V_{5a}$ appears when the reflected beam 7 from the pattern 5a having the high reflection factor passes in front of the pin-hole 10. In this case, the level of the output $V_{5a}$ is higher than that of the output $V_5$ appearing at the exactly focused position 8. Consequently, when such a peak output $V_{5a}$ appears at the oscillating position $x_1$ of the pin-hole plate 9, this position will be erroneously detected to be the exactly focused position of the object 5 relative to the objective lens 4.

Thus, the prior art device has been unable to accurately detect the true focusing position when a pattern having a high reflection factor is present on the surface of an object and has therefore been unable to attain the function of automatic focusing. While the above description has referred to the case in which a pattern having a high reflection factor is present on the surface of an object, the same applies also to the cases in which a pattern having a low reflection factor and a stepped pattern are present. In such cases too, the prior art device has been unable to attain the function of automatic focusing because a point at which the photoelectric element generates its maximum output does not necessarily coincide with the true focusing position. It has therefore been a common practice to detect the height of a pattern on the surface of an object by means of an air micrometer for the purpose of automatic focusing. However, blowing of a stream of air onto the surface of the object has resulted in blowing of fine dust particles at the same time. In the past, accumulation of fine dust particles on the surface of the object did not pose any substantial practical problem. However, with the recent trend of producing finer patterns in the fields of semiconductor and other industries, accumulation of such fine dust particles has frequently resulted in the production of defective patterns, and it has been the tendency that the air micrometer finds lesser applications in these industrial fields.

SUMMARY OF THE INVENTION

It is a primary object of the present invention to provide a novel and improved focusing position detecting device which obviates the prior art defects pointed out above and which ensures automatic focusing in spite of the presence of patterns such as a pattern having a high reflection factor, a pattern having a low reflection factor and a stepped pattern on the surface of an object.

The present invention is featured by the fact that the reflected beam from the surface of an object is sensed by a second photoelectric element disposed independently of the aforementioned photoelectric element provided for the purpose of detecting the beam concentrating position, and the intensity of the laser beam is so controlled that the second photoelectric element generates always an output of constant level.

The above and other relevant objects, features and advantages of the present invention will become apparent when the description based on the accompanying drawings and the novel matters pointed out in the appended claims are carefully read.

DESCRIPTION OF THE PREFERRED EMBODIMENTS

Preferred embodiments of the focusing position detecting device according to the present invention will now be described in detail with reference to the drawings.

Figure 5:
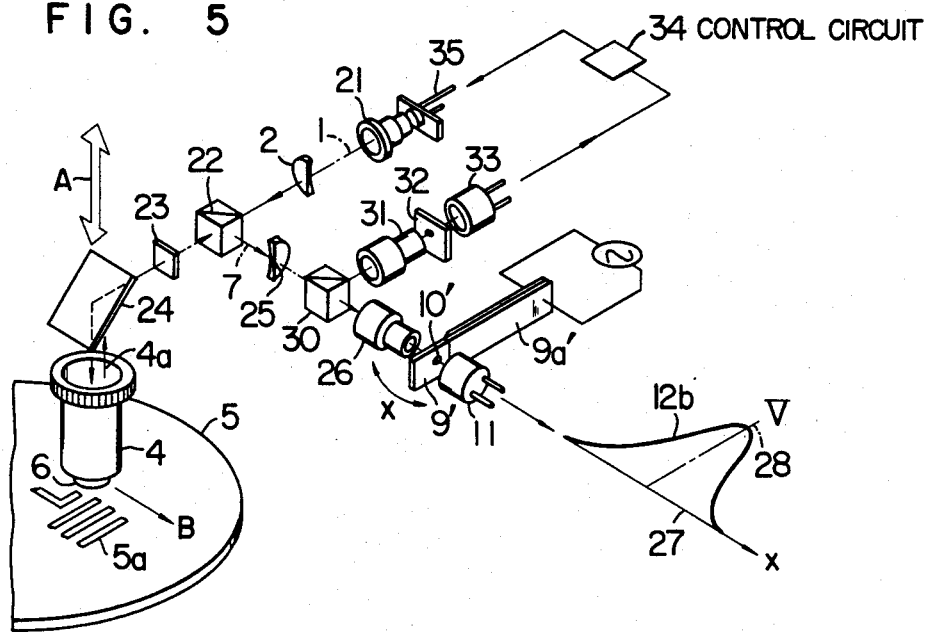
FIG. 5 is a partly exploded perspective view showing in detail the structure of a first preferred embodiment of the focusing position detecting device according to the present invention.

FIG. 5 is a partly exploded prespective view showing in detail the structure of a first preferred embodiment of the present invention. In FIG. 5, the same reference numerals are used to designate the same parts appearing in FIG. 3. The device of the present invention shown in FIG. 5 differs from the prior art device shown in FIG. 3 in the two points which will be described presently. In the first place, an additional beam splitter 30 is disposed between the concave lens 25 and the condenser lens 26 in the focusing position detecting system so as to divert a portion of the beam 7 reflected from the object 5, and a control system is provided for controlling the intensity of the laser beam 1 depending the level of the thus diverted beam. This control system includes, in addition to the polarization beam splitter 30, a condenser lens 31, a second pin-hole plate 32, a second photoelectric element 33 and a control circuit 34. Secondly, a semiconductor laser oscillator 35 is employed as the laser beam source. This semiconductor laser oscillator 35 is featured by the fact that, in response to the control of the voltage applied thereto, the intensity of the laser beam emitted therefrom changes at a very high response speed.

The operation of the device having the structure shown in FIG. 5 will now be described. The laser beam 1 emitted from the semiconductor laser oscillator 35 is converged by the convex lens 21, diverged by the concave lens 2, and, after passing through the polarization beam splitter 22 and quarter wavelength element 23, reflected by the reflector 24 and projected through the objective lens 4 to form a minute spot 6 on the object 5. The reflected beam 7 from the surface of the object 5 is concentrated by the objective lens 4 again, and, after being reflected by the reflector 24 and passing through the quarter wavelength element 23, reflected by the polarization beam splitter 22. The arrow A in FIG. 5 indicates the optical path of the observing system.

The beam 7 reflected by the polarization beam splitter 22 is diverged by the concave lens 25 and is then split by the polarization beam splitter 30 into two portions. One of the portions is directed toward the reflected beam intensity measuring optical system in the control system added according to the present invention, and the other portion is directed toward the focusing position detecting optical system described already with reference to FIG. 3. The latter or focusing position detecting optical system detects the focusing position of the laser beam 1 on the surface of the object 5 and includes the condenser lens 26, a slit plate 9' having a slit 10', a bimorph oscillation element 9a' and the photoelectric element 11. The bimorph oscillation element 9a' for causing oscillation of the slit plate 9' is mounted in a cantilever mode. In the present invention, the conventional pin-hole 10 is replaced by the slit 10' to deal with the displacement of the oscillating slit plate 9' in the direction shown by the arrow x.

The portion of the reflected beam 7 directed by the polarization beam splitter 30 toward the reflected beam intensity measuring optical system is concentrated by the condenser lens 31 and passes through the pin-hole of the pin-hole plate 32 to be incident upon the second photoelectric element 33. The photoelectric element 33 converts the intensity of the reflected beam 7 into an electrical quantity, and such an output from the photoelectric element 33 is fed back through the control circuit 34 to the semiconductor laser oscillator 35 to control the semiconductor laser oscillator 35 so that the output from the photoelectric element 33 can be maintained constant. Therefore, regardless of a variation of the reflection factor of the object 5 during the oscillation of the slit plate 9', the intensity of the reflected beam 7 is controlled to be maintained constant, and the first photoelectric element 11 generates an output waveform as shown by a curve 12b in FIG. 5. Therefore, the desired automatic focusing can be attained by vertically moving the object 5 until the first photoelectric element 11 generates its maximum output at the center of oscillation of the slit 10'.

The pin-hole plate 32 disposed in front of the second photoelectric element 33 is provided so that the reflected beam 7 from the surface of the object 5 can only be sensed. This pin-hole plate 32 acts to block incidence of that portion of the beam which is reflected from the back surface of the object 5 when the object 5 to be observed is, for example, a transparent one.

Figure 6:
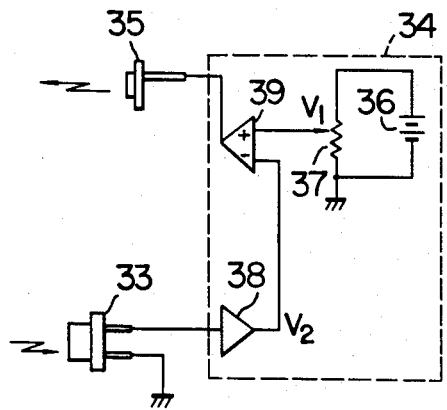
FIG. 6 is a circuit diagram of one form of the control circuit preferably employed in the embodiment shown in FIG. 5.

FIG. 6 is a circuit diagram of one form of the control circuit 34 preferably employed in the present invention.

The purpose of the control circuit 34 shown in FIG. 6 is to control the voltage applied to the semiconductor laser oscillator 35 so that the output from the second photoelectric element 33 can be maintained at a predetermined voltage level $V_1$. This predetermined voltage level $V_1$ is determined by the combination of a regulated voltage source 36 and a potentiometer 37. Referring to FIG. 6, the output from the photoelectric element 33 is amplified by an amplifier 38 to appear as an output voltage $V_2$. The voltage $V_1$ produced by the combination of the regulated voltage source 36 and the potentiometer 37 and the output voltage $V_2$ from the amplifier 38 are applied to a differential amplifier 39, and its output is applied to the semiconductor laser oscillator 35. Thus, the semiconductor laser oscillator 35 generates the laser beam 1 in such a relation that the output voltage $V_2$ from the amplifier 38 is always equal to the predetermined voltage $V_1$.

Figure 1:
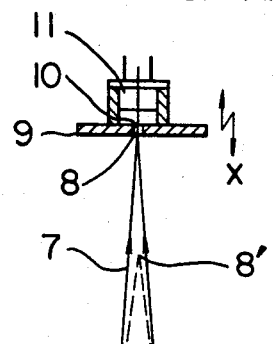
FIG. 1 is a diagrammatic front elevation view of part of a commonly employed, focusing position detecting system.
Figure 2:
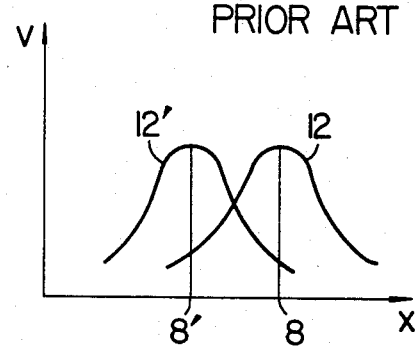
FIGS. 2 and 4 show the waveforms of the outputs from the photoelectric element employed in the device shown in FIG. 1.
Figure 4:
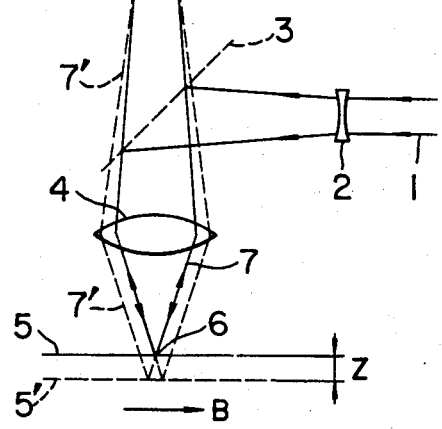
Figure 4:
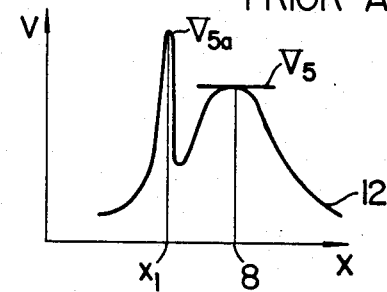
Figure 7:
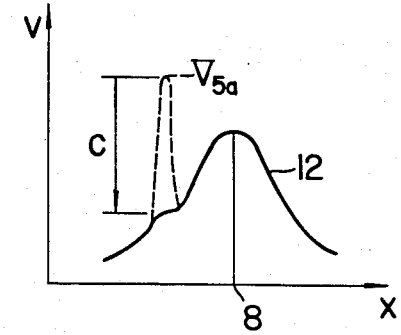
FIG. 7 shows the waveform of the output from the first photoelectric element employed in the embodiment shown in FIG. 5.
Figure 3:
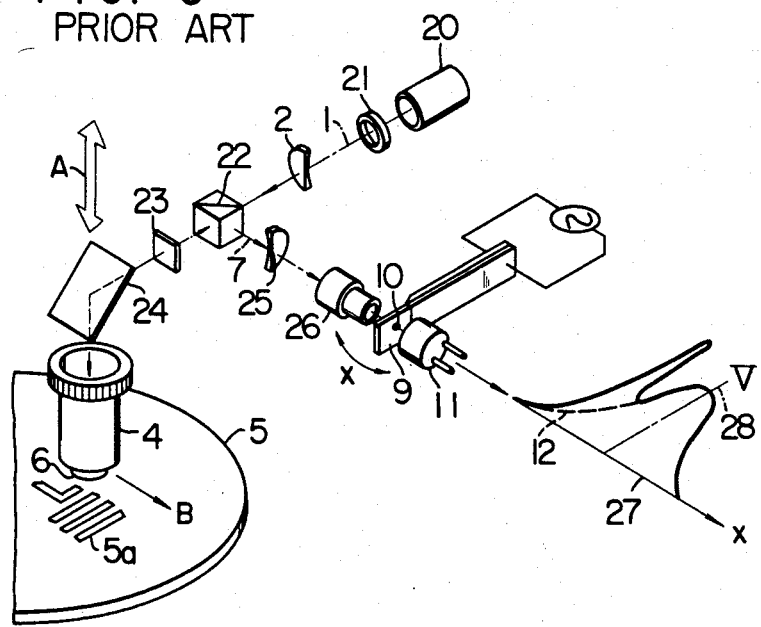
FIG. 3 is a partly exploded perspective view showing in detail the structure of a prior art focusing position detecting device.

It will be seen from the above detailed description that, by the use of the reflected beam intensity measuring optical system shown in FIG. 5 and the control system including the control circuit 34 shown in FIG. 6, the control circuit 34 acts to lower the level of the laser beam 1 emitted from the semiconductor laser oscillator 35 when a peak output $V_{5a}$ as shown in FIG. 4 is detected as a result of passing of the beam reflected from a pattern having a high reflection factor in front of the pin-hole 10 (the slit 10') during oscillation thereof, as described with reference to FIGS. 3 and 4. FIG. 7 shows the waveform of the output V from the first photoelectric element 11 when the semiconductor laser oscillator 35 is so controlled. It will be seen in FIG. 7 that the peak output $V_{5a}$ shown in FIG. 4 is sufficiently suppressed as indicated by the arrow C. Therefore, the possibility of erroneous detection or mal-detection of the true focusing position is eliminated, and the true focusing position can be reliably detected.

It will thus be understood that the present invention provides a highly universal automatic focusing device which dispenses with the use of the air micrometer and which reduces greatly the rate of production of rejects in the step of formation of very small patterns.

While the first embodiment of the present invention shown in FIG. 5 has been described specifically with reference to the case in which a pattern having a high reflection factor is present on an object, it will be readily apparent that the focusing position on an object having a pattern having a low reflection factor and a stepped pattern can be similarly reliably detected by the utilization of the technical idea of the present invention according to which the intensity of the laser beam is controlled on the basis of the result of measurement of the intensity of the reflected beam.

In the course of repeated experiments using the device shown in FIG. 5, the inventors have found a phenomenon as described now. Such a phenomenon will be explained with reference to FIG. 5 again. In FIG. 5, the beam 7 reflected from the surface of the object 5 is to be the only one to be incident upon the photoelectric elements 11 and 33. Actually, however, there is a beam 4a reflected from the objective lens 4 itself. That is, when the laser beam 1 emitted from the semiconductor laser oscillator 35 is reflected by the reflector 24 and is then incident upon the objective lens 4, the beam 4a reflected from the objective lens 4 itself is directed toward the photoelectric elements 11 and 33.

In the focusing position detection and the reflected beam intensity measurement for the purpose of the focusing position detection according to the present invention, the reflected beam 7 from the surface of the object 5 bears an important significance as will be apparent from the foregoing description. Therefore, an undesirable influence of the reflected beam 4a from the objective lens 4 itself, as described above, must be eliminated.

The inventors have conducted an experiment for finding the ratio between the intensity of the reflected beam 4a due to the above phenomenon and that of the reflected beam 7 from the object 5 by measuring the output from the photoelectric element 33, that is, the ratio $V_b:V_c$ between the component $V_b$ of the output from the photoelectric element 33 due to the reflected beam 4a and the component $V_c$ of the output from the photoelectric element 33 due to the reflected beam 7. The inventors have obtained the following experimental results although the above ratio is variable depending on the kind of the object 5, that is, the reflection factor of the surface of the object 5:

(a) When the object 5 has a high reflection factor, the ratio is given by $$V_b:V_c = 1:20.$$

(b) When a thin film is formed on the surface of the object 5, and the object has a low reflection factor, the relation $V_b > V_c$ holds frequently, and the ratio is given by $$V_b:V_c = 5:1.$$

In the experimental results above described, the relation $V_b << V_c$ holds in (a), and this means that the embodiment shown in FIG. 5 can sufficiently detect the focusing position.

However, the inventors have invented a focusing position detecting device which solves also the problem pointed out in (b), in an effort to further enhance the universalization of the present invention. Embodiments of such a device will be described with reference to FIGS. 8 and 9. Such a focusing position detecting device has a structure based on the structure shown in FIG. 5 and can detect the focusing position even when the object has a low reflection factor or includes a plurality of patterns having different reflection factors.

Figure 8:
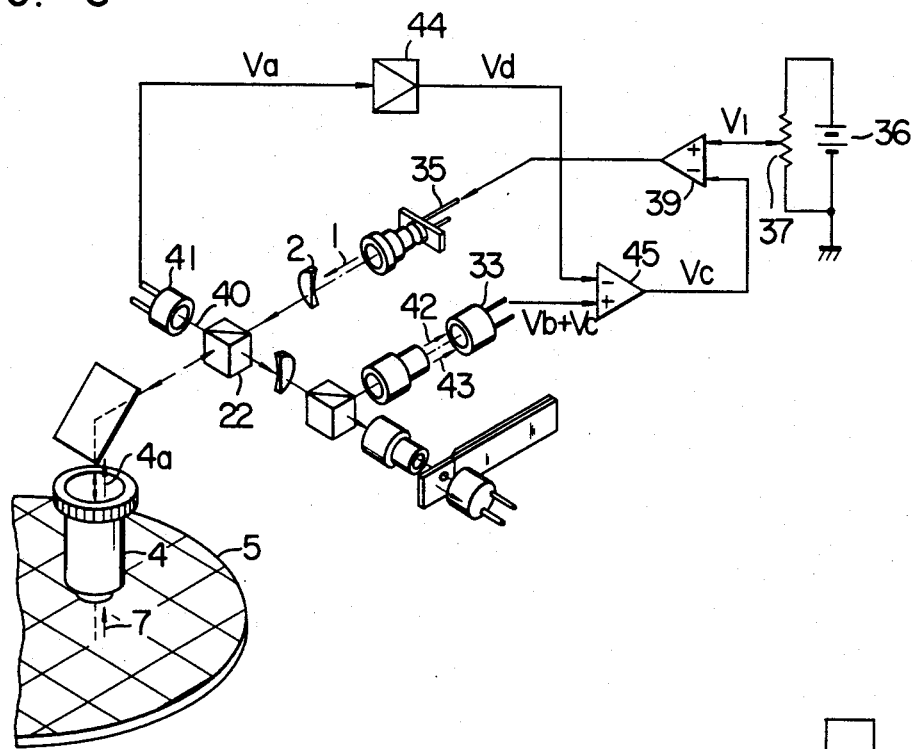
FIGS. 8 and 9 are partly exploded perspective views showing in detail the structure of a second and a third preferred embodiment of the focusing position detecting device according to the present invention.
Figure 9:
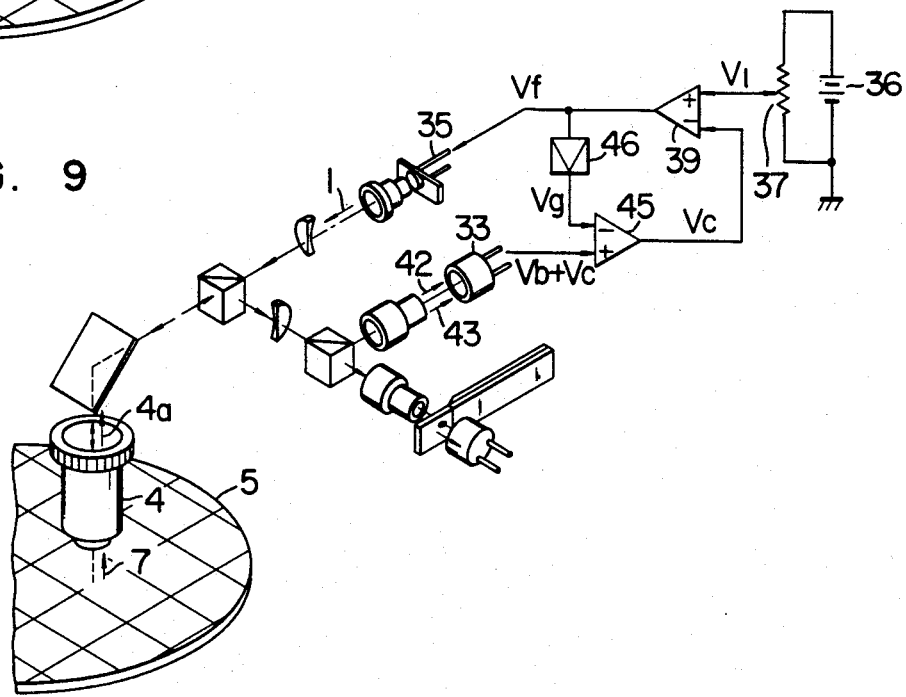

The two embodiments shown in FIGS. 8 and 9 are featured by the fact that, in addition to the provision of a reflected beam intensity measuring optical system including a second photoelectric element as shown in FIG. 5 as its essential part, there are provided means for sensing the output from a laser beam emitter, converting means for multiplying the output from the laser beam output sensing means by a previously calculated coefficient to amplify or attenuate the sensor output thereby finding the converted output value indicative of the intensity of another beam incident upon the second photoelectric element together with the beam reflected from the surface of the object, and control means for subtracting the converted output from the output of the second photoelectric element to limit the output of the second photoelectric element to that corresponding to the component of the reflected beam from the surface of the object only and to apply the resultant output to control means controlling the laser beam emitter, whereby the intensity of the laser beam emitted from the laser emitter is so controlled as to maintain constant the output indicative of the result of substraction.

The laser beam emitter output sensing means employed in the embodiments shown in FIGS. 8 and 9 embodies one of the following three forms:

(1) A third photoelectric element using a portion of the laser beam 1 diverted from the path of the laser beam 1 toward the objective lens 4.
(2) A third photoelectric element sensing the laser beam emitted in a direction opposite to the direction of emission of the laser beam 1 from the semiconductor laser beam oscillator 35.
(3) A circuit by which the voltage itself applied to the semiconductor laser oscillator 35 is introduced to an amplifier or attenuator.

As described hereinbefore with reference to FIG. 5, a portion 42 (FIG. 8) of the reflected beam 4a from the objective lens 4 and a portion 43 (FIG. 8) of the reflected beam 7 from the object 5 are incident upon the second photoelectric element 33. Therefore, for the purpose of the control of the laser beam 1 emitted from the semiconductor laser oscillator 35, the output component $V_b$ resulting from the incidence of the portion 42 of the reflected beam 4a from the objective lens 4 may be substracted from the output $(V_b + V_c)$ of the photoelectric element 33, and the remaining output component, that is, the output $V_c$ of the photoelectric element 33 corresponding to the portion 43 (FIG. 8) of the reflected beam 7 from the surface of the object 5 may be maintained constant.

The inventors will now explain how to find the component $V_b$ of the output of the photoelectric element 33 corresponding to the incident portion 42 of the reflected beam 4a from the objective lens 4. The intensity of the reflected beam 4a from the objective lens 4 is proportional to that of the laser beam 1 emitted from the semiconductor laser oscillator 35. Therefore, by detecting the intensity of the laser beam 1, the intensity of the portion 42 of the reflected beam 4a from the objective lens 4 can be found, and, consequently, the intensity of the portion 43 of the reflected beam 7 from the object 5 can be found.

The structure of the second embodiment of the present invention will now be described with reference to FIG. 8. As described hereinbefore, the important feature of the device according to the present invention resides in the fact that the output from the semiconductor laser oscillator 35 is so controlled as to maintain constant the intensity of the beam 7 reflected from the surface of the object 5. Therefore, the structure of the reflected beam intensity measuring optical system in the second embodiment shown in FIG. 8 is entirely the same as that in the first embodiment of the present invention shown in FIG. 5. The second embodiment shown in FIG. 8 includes additional means added to the structure shown in FIG. 5. Therefore, explanation of the same parts as those shown in FIG. 5 is omitted to avoid repetition.

The laser beam 1 emitted from the semiconductor laser oscillator 35 is partly reflected by the polarization beam splitter 22, and the reflected beam portion 40 is directed toward a third photoelectric element 41 from which an output $V_a$ appears.

On the other hand, the second photoelectric element 33 senses the portion 42 of the reflected beam 4a from the objective lens 4 and the portion 43 of the reflected beam 7 from the object 5, and the corresponding output components $V_b$ and $V_c$ appear from the second photoelectric element 33. Thus, the actual output from the second photoelectric element 33 is given by $(V_b+V_c)$.

The output $V_a$ from the third photoelectric element 41 is applied to an amplifier 44 having an amplification factor $V_b/V_a$, and an output $V_d$ which is equal to $V_b$ appears from the amplifier 44, as follows:

$$V_d = \frac{V_b}{V_a} \times V_a = V_b$$

This output $V_d(=V_b)$ from the amplifier 44 is applied to a differential amplifier 45 together with the output $(V_b+V_c)$ from the second photoelectric element 33, and an output equal to $V_c$ appears from the differential amplifier 45. This output $V_c$ is applied to the differential amplifier 39 together with the voltage $V_1$ determined by the combination of the regulated voltage source 36 and the potentiometer 37, and the resultant output from the differential amplifier 39 is used to control the intensity of the laser beam 1 emitted from the semiconductor laser oscillator 35. Thus, the voltage applied to the semiconductor laser oscillator 35 is controlled so that $V_c$ can be maintained constant at the level of $V_1$, hence, the intensity of the beam 7 reflected from the surface of the object 5 can be maintained constant. In this manner, the intensity of the reflected beam 7 from the object 5 can be maintained constant without being effected by the reflected beam 4a from the objective lens 4.

In the second embodiment above described, a portion of the laser beam 1 emitted from the semiconductor laser oscillator 35 is reflected by the beam splitter 22 to be sensed by the third photoelectric element 41 functioning as the laser beam output sensing means. However, in the case of the semiconductor laser emitter 35, a laser beam is also emitted in the rearward direction. Therefore, a photoelectric element for sensing such a laser beam may be provided to attain the same effect.

The third photoelectric element 41 provided for sensing the portion of the laser beam 1 for the purpose of laser beam output detection may be eliminated, and the voltage applied to the semiconductor laser oscillator 35 may be detected in lieu of the detection of the laser beam output, since, in the case of the semiconductor laser oscillator 35, the intensity of the laser beam emitted therefrom is approximately proportional to the level of the voltage applied thereto. Suppose that $V_f$ is the voltage applied to the semiconductor laser oscillator 35 in the third embodiment shown in FIG. 9. Then, the laser beam 1 emitted from the semiconductor laser oscillator 35 has an intensity substantially proportional to the level of the applied voltage $V_f$, and the beam 4a of proportional intensity is reflected from the surface of the objective lens 4. Consequently, the portion 42 of the reflected beam 4a of proportional intensity is incident upon the second photoelectric element 33. At the same time, the portion 43 of the reflected beam 7 from the surface of the object 5, having an intensity proportional to the laser beam intensity, is also incident upon the second photoelectric element 33. Consequently, the output appearing from the photoelectric element 33 is given by $(V_b+V_c)$ corresponding to the intensities of the beam portions 42 and 43. Since the output component $V_b$ resulting from the incidence of the portion 42 of the reflected beam 4a is proportional to the applied voltage $V_f$, $V_b$ is expressed as:

$$V_b = kV_f$$

where k is the proportional constant.

Therefore, when the voltage $V_f$ applied to the semiconductor laser oscillator 35 is applied to an amplifier 46 having an amplification factor k, the output $V_g$ from the amplifier 46 is given by $V_g=kV_f=V_b$. This voltage $V_g=V_b$ is applied to the differential amplifier 45 together with the voltage $(V_b+V_c)$, as described with reference to FIG. 8, and the output $V_c$ appears from the differential amplifier 45. Then, this voltage $V_c$ and the regulated voltage $V_1$ are applied to the differential amplifier 39, and the output from the differential amplifier 39 is used to control the intensity of the laser beam 1 emitted from the semiconductor laser oscillator 35. In this manner, the voltage $V_c$ is controlled to be constant so that the intensity of the reflected beam 7 from the object 5 can be maintained constant.

Figure 10:
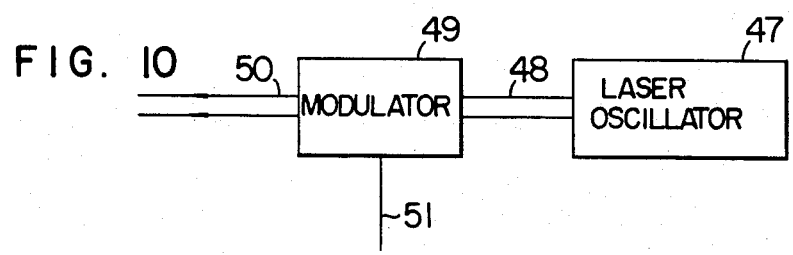
FIG. 10 is a block diagram showing another form of the laser beam source preferably employed in the present invention.

In the aforementioned embodiments of the present invention, the semiconductor laser oscillator 35 has been referred to as a preferred laser beam source. However, a laser beam source, for example, a He-Ne laser oscillator 47 capable of emitting a constant output 48 as shown in FIG. 10 may be employed in lieu of the semiconductor laser oscillator 35. In such a case, a modulator 49, for example, an AO modulator (an acoustic type beam modulator) or an EO modulator (an electronic type beam modulator) capable of changing the intensity of the laser beam at a high speed is preferably inserted in the optical path of the laser beam output, so that, by application of a control signal 51 to the modulator 49, a laser beam 50 having a changeable intensity entirely similar to that described in the embodiments employing the semiconductor laser oscillator 35 can be obtained.

The prior art device has been unable to optically detect the focusing position on an object 5 having a very low reflection factor, because the intensity of the beam 4a reflected from the objective lens 4 is higher than that of the beam 7 reflected from the object 5. In sharp contrast, it has become possible, according to the device of the present invention, to optically detect the focusing position on an object even when the reflection factor of the object is not more than 0.1%.

In future, the object and the objective lens will more frequently be immersed in oil for the purpose of observation of very small patterns with a high resolution, and, in such a case, the intensity of the beam reflected from the object will be extremely attenuated. In such a special case, the focusing position detection will be nearly impossible unless the device according to the present invention is relied upon. Thus, the industrial importance of the device of the present invention will increase more and more.

We claim:

1. A focusing position detecting device in which a laser beam is directed through an objective lens toward and onto the surface of an object to form a minute spot on the surface of said object, and the beam reflected from the surface of said object is sensed to detect the focusing position of said objective lens, said device comprising:

(a) laser beam emitting means for emitting the laser beam;

(b) an incidence optical system guiding the laser beam emitted from said laser beam emitting means toward said objective lens;

(c) a focusing position detecting optical system guiding from said objective lens the beam reflected from the surface of said object so as to lead said reflected beam toward a concentrating point, said optical system including at least an oscillating plate provided with a pin-hole or a slit in the vicinity of the concentrating point of said reflected beam and arranged for oscillation in the direction of the optical path of said reflected beam and a first photoelectric element converting the intensity of the reflected beam passing through the pin-hole or slit of said oscillation plate into a corresponding electrical quantity;

(d) a reflected beam intensity measuring optical system receiving a portion of said reflected beam for measuring the intensity of said reflected beam, said optical system including at least a second photoelectric element detecting the intensity of said reflected beam; and (e) control means receiving the intensity-indicative output from said second photoelectric element as an input for controlling the intensity of the laser beam emitted from said laser beam emitting means whereby to maintain the constant the intensity-indicative output from said second photoelectric element.

2. A focusing position detecting device as claimed in claim 1, wherein said laser beam emitting means is a semiconductor laser oscillator.

3. A focusing position detecting device as claimed in claim 1, wherein a pin-hole plate is disposed in front of said second photoelectric element.

4. A focusing position detecting device as claimed in claim 1, wherein said laser beam emitting means is a semiconductor laser beam oscillator, and said control means includes an amplifier amplifying the output of said second photoelectric element, a regulated voltage circuit supplying a regulated voltage, and a differential amplifier receiving the output from said amplifier and the regulated voltage from said regulated voltage circuit as its inputs and applying the resultant output to said semiconductor laser oscillator.

5. A focusing position detecting device in which a laser beam is directed through an objective lens toward and onto the surface of an object to form a minute spot on the surface of said object, and the beam reflected from the surface of said object is sensed to detect the focusing position of said objective lens, said device comprising:

(a) laser beam emitting means for emitting the laser beam;

(b) an incidence optical system guiding the laser beam emitted from said laser beam emitting means toward said objective lens;

(c) a focusing position detecting optical system guiding from said objective lens the beam reflected from the surface of said object so as to lead said reflected beam toward a concentrating point, said optical system including at least an oscillating plate provided with a pin-hole or a slit in the vicinity of the concentrating point of said reflected beam and arranged for oscillation in the direction of the optical path of said reflected beam and a first photoelectric element converting the intensity of the reflected beam passing through the pin-hole or slit of said oscillating plate into a corresponding electrical quantity;

(d) a reflected beam intensity measuring optical system receiving a portion of said reflected beam for measuring the intensity of said reflected beam, said optical system including at least a second photoelectric element detecting the intensity of said reflected beam;

(e) converting means for sensing the output of said laser beam emitting means and finding, on the basis of said sensed output of said laser beam emitting means, at least the intensity of the portion of said laser beam reflected by said objective lens itself; and (f) control means subtracting the output of said converting means from the intensity-indicative output of said second photoelectric element for controlling the intensity of the laser beam emitted from said laser beam emitting means whereby to maintain constant the result of subtraction.

6. A focusing position detecting device as claimed in claim 5, wherein said laser beam emitting means is a semiconductor laser oscillator.

7. A focusing position detecting device as claimed in claim 5, wherein said converting means includes a third photoelectric element sensing the output of said laser beam emitting means and an amplifier having an amplification factor determined for finding, on the basis of the output of said third photoelectric element, the intensity of the portion of said laser beam reflected by said objective lens itself.

8. A focusing position detecting device as claimed in claim 7, wherein said third photoelectric element is disposed so as to sense a laser beam emitted from said laser beam emitting means in a direction opposite to that of said laser beam directed along said incidence optical system.

9. A focusing position detecting device as claimed in claim 6, wherein said converting means includes at least an amplifier finding, on the basis of the voltage applied to said semiconductor laser oscillator, the intensity of at least the portion of said laser beam reflected by said objective lens itself.

* * * * *